US009575212B2

(12) United States Patent
Grubbs et al.

(10) Patent No.: US 9,575,212 B2
(45) Date of Patent: Feb. 21, 2017

(54) CHIRAL POLYMERS FOR THE SELF-ASSEMBLY OF PHOTONIC CRYSTALS

(71) Applicant: California Institute of Technology, Pasadena, CA (US)

(72) Inventors: Robert H. Grubbs, South Pasadena, CA (US); Garret M. Miyake, Altadena, CA (US); Raymond Weitekamp, Glendale, CA (US); Victoria Piunova, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 14/188,961

(22) Filed: Feb. 25, 2014

(65) Prior Publication Data

US 2014/0243483 A1 Aug. 28, 2014

Related U.S. Application Data

(60) Provisional application No. 61/769,611, filed on Feb. 26, 2013.

(51) Int. Cl.
*G02B 5/30* (2006.01)
*G02B 1/00* (2006.01)
*G02B 6/122* (2006.01)

(52) U.S. Cl.
CPC ........... *G02B 1/005* (2013.01); *G02B 5/3016* (2013.01); *G02B 6/1225* (2013.01)

(58) Field of Classification Search
CPC ........ G02B 5/30; C08G 18/025; C08G 18/10; C09D 163/00
See application file for complete search history.

(56) References Cited

U.S. PATENT DOCUMENTS 5,847,068 A * 12/1998 Maxein et al. ................. 528/69

OTHER PUBLICATIONS

Campbell et al. "Fabrication of photonic crystals for the visible spectrum by holographic lithography." Nature, vol. 404, pp. 53-56, Mar. 2000.*
Maxein et al.,Opalescent Cholesteric Networks from Chiral Polyisocyanates in Polystyrene, Advanced Materials 10, 341-345, Mar. 1998.*
Miyake, et al. Synthesis of Isocyanate based brush block copolymers and their rapid self assembly to infrared reflecting photonic crystals, Journal of the American Chemical Society, 134, 14249-14254 Aug. 14, 2012.*
Sveinbjörnsson, et al. Rapid self-assembly of brush block copolymers to photonic crystals, Proceedings of the National Academy of Sciences, 109 14332-14336, Sep. 4, 2012.*
Kang et al, Ultrafast Cyclopolymerization for Polyene Synthesis: Living Polymerization to Dendronized Polymers, Journal of the American Chemical Society, 133, 11904-11907, Jun. 30, 2011.*
Maeda, et al. Helical polymer brushes with a preferred-handed helix-sense triggered by a terminal optically active group in the pendant, Chemical Communications 48, 3342-3344, Feb. 17, 2012.*
Ro, et al. Experimental Study of Chiral Composites, SPIE Wave Propagation and Scattering in Varied Media, vol. 1558, 269-287, Jul. 21, 1991.*
S.M. Aharoni. "Rigid Backbone Polymers. 2. Polyisocyanates and Their Liquid-Crystal Behavior." *Macromolecules* 1979, 12, 94-103.
J.M. Carney et al.. "Intramolecular Hydroamination of Aminoalkynes with Silver—Phenanthroline Catalysts." *Org. Lett.* 2008, 10, 3903-3906.
M.M. Green et al.. "Macromolecular Stereochemistry: The Out-of-Proportion Influence of Optically Active Comonomers on the Conformational Characteristics of Polyisocyanates. The Seargeants and Soldiers Experiment." *J. Am. Chem. Soc.* 1989, 111, 6452-6454.
M.M. Green et al.. "The Macromolecular Route to Chiral Amplification." *Angew. Chem. Int. Ed.* 1999, 38, 3138-3154.
J.A. Johnson et al.. "Core-clickable PEG-branch-azide bivalent-bottle-brush polymers by ROMP: grafting-through and clicking-to." *J. Am. Chem. Soc.* 2011, 133, 559-566.
J.A. Johnson et al.. "Drug-loaded, bivalent-bottle-brush polymers by graft-through ROMP." *Macromolecules* 2010, 43, 10326-10335.
E.-H. Kang et al.. "Ultrafast Cyclopolymerization for Polyene Synthesis: Living Polymerization to Dendronized Polymers." *J. Am. Chem. Soc.* 2011, 133, 11904-11907.
J.O. Krause et al.. "Simple Synthesis of Poly(acetylene) Latex Particles in Aqueous Media." *Angew. CHem. Int. Ed.* 2003, 42, 5965-5969.
P.S. Kumar et al.. "Factors Relevant for the Regioselective Cyclopolymerization of 1,6-Heptadiynes, N,N-Dipropargylamines, N,N-Dipropargylammonium Salts, and Dipropargyl Ethers by $Ru^{IV-Alkylidene-Based\ Metathesis\ Initiators}$." *J. Am. Chem. Soc.* 2009, 131, 387-395.
J.A. Love et al.. "A Practical and Highly Active Ruthenium-Based Catalyst that Effects the Cross Metathesis of Acrylonitrile." *Angew. Chem. Int. Ed.* 2002, 41, 4035-4037.
K. Maeda et al.. "Helical polymer brushes with a preferred-handed helix-sense triggered by a terminal optically active group in the pendant." *Chem. Comm.* 2012, 48, 3342-3344.
J.B. Matson et al.. "Synthesis of Fluorine-18 Functionalized Nanoparticles for use as in vivo Molecular Imaging Agents." *J. Am. Chem. Soc.* 2008, 130, 6731-6733.
G. Maxein et al.. "Opalescent Cholesteric Networks from Chiral Polyisocyanates in Polystyrene." *Adv. Mater.* 1998, 10, 341-345.
G. Maxein et al.. "Structure-Property Relations in Cholesteric Networks from Chiral Polyisocyanates." Macromolecules 1999, 32, 5747-5754.
S. Mayer et al.. "Chiral polyisocyanates, a special class of helical polymers." *Prog. Polym. Sci.* 2001, 26, 1973-2013.

(Continued)

*Primary Examiner* — Randy Gulakowski
*Assistant Examiner* — Christopher M Rodd
(74) *Attorney, Agent, or Firm* — Foley Hoag LLP

(57) ABSTRACT

Described herein are copolymers constructed from chiral, non-racemic monomers, which self-assemble to photonic crystals. The difficulty of incorporating chiral elements into photonic crystals has limited the ability to generate unique bandstructures for different circular polarizations of light. The materials and methods described herein relate to easily, predictably fabricating chiral photonic crystals having desirable optical properties.

18 Claims, 6 Drawing Sheets

(56) References Cited

OTHER PUBLICATIONS

M.G. Mayershofer et al.. "Bi- and Trinuclear Ruthenium Alkylidene Triggered Cyclopolymerization of 1,6-Heptadiynes: Access to $A_n$-X-$A_n$ Block and $(A_n)_3$X Tristar Copolymers." *Macromolecules* 2006, 39, 3484-3493.

G.M. Miyake et al.. "Precisely Tunable Photonic Crystals From Rapidly Self-Assembling Brush Block Copolymer Blends." *Angew. Chem. Int. Ed.* 2012, 51, 11246-11248.

G.M. Miyake et al.. "Synthesis of Isocyanate-Based Brush Block Copolymers and Their Rapid Self-Assembly to Infrared-Reflecting Photonic Crystals." *J. Am. Chem. Soc.* 2012, 134, 14249-14254.

G.M. Miyake et al.. "Stereospecific Polymerization of Chiral Oxazolidinone-Functionalized Alkenes." *Macromolecules* 2010, 43, 7504-7514.

A.B. Pangborn et al.. "Safe and Convenient Procedure for Solvent Purification." *Organometallics* 1996, 15, 1518-1520.

T.E. Patten et al.. "'Living' Titanium(IV) Catalyzed Coordination Polymerizations of Isocyanates." *J. Am. Chem. Soc.* 1991, 113, 5065-5066.

T.E. Patten et al.. "Living Organotitanium(IV)-Catalyzed Polymerizations of Isocyanates." *J. Am. Chem. Soc.* 1996, 118, 1906-1916.

P.N. Shah et al.. "Chiroptical Properties of Graft Copolymers Containing Chiral Poly($\eta$-hexyl isocyanate) as a Side Chain." *Macromolecules* 2011, 44, 7917-7925.

B.R. Sveinbjörnsson et al.. "Rapid self-assembly of brush block copolymers to photonic crystals." *Proc. Natl. Acad. Sci.* 2012, 109, 14332-14336.

Y.S. Vygodskii et al.. "Cyclopolymerization of N,N-Dipropargylamines and N,N-Dipropargyl Ammonium Salts." *Macromolecules* 2008, 41, 1919-1928.

Y. Xia et al.. "Efficient Synthesis of Narrowly Dispersed Brush Copolymers and Study of Their Assemblies: The Importance of Side Chain Arrangement." *J. Am. Chem. Soc.* 2009, 131, 18525-18532.

Y. Xia et al.. "Efficient Synthesis of Narrowly Dispersed Brush Polymers via Living Ring-Opening Metathesis Polymerization of Macromonomers." *Macromolecules* 2009, 42, 3671-3766.

E. Yashima et al.. "Helical Polymers: Synthesis, Structures, and Functions." *Chem. Rev.* 2009, 109, 6102-6211.

\* cited by examiner

Figure 3

| MM | I[a] | [HICN]:[(R)-ICN]:[I] | Time (h) | Yield (%)[b] | $M_w$ (kDa)[c] | MWD $(M_w/M_n)$[c] | $[\alpha]^{25}_D$ (°)[d] |
|---|---|---|---|---|---|---|---|
| 1 | 2 | 170:30:1 | 24 | 48.8 | 12.7 | 1.21 | -85.9 |
| 2 | 3 | 155:15:1 | 20 | 80.5 | 21.3 | 1.10 | -102.7 |
| 3 | 4 | 110:15 | 22 | 78.9 | 16.6 | 1.10 | -90.7 |

Figure 4

| run no. | MM | [MM]/[I] | Time (h) | Yield (%)[b] | $M_w$ (kDa)[c] | MWD $(M_w/M_n)$[c] | $[\alpha]^{25}_D$ (°)[d] |
|---|---|---|---|---|---|---|---|
| 1 | 1 | 50 | 2 | 96.0 | 1185 | 1.09 | -87.9 |
| 2 | 2 | 50 | 5 | 65.8 | 1027 | 1.14 | -99.8 |
| 3 | 3 | 50 | 1 | 99.5 | 648.0 | 1.13 | n.d.[e] |

CHIRAL POLYMERS FOR THE SELF-ASSEMBLY OF PHOTONIC CRYSTALS

CROSS-REFERENCE TO RELATED APPLICATIONS

The present application claims the benefit of U.S. Provisional Application No. 61/769,611, filed on Feb. 26, 2013, which is incorporated herein by reference in its entirety.

BACKGROUND OF THE INVENTION

Photonic crystals are composite materials with periodically arranged domains, such that the periodic modification of the dielectric function leads to constructive interference of the reflected light for certain wavelengths. The regions of the spectrum that are completely reflected are referred to as photonic bandgaps. The energy of allowed modes of propagation as a function of wavevector is generally referred to as the "bandstructure" of the photonic crystal. The bandgap is where there are no modes for light of a specific energy to propagate through the material. The bandstructure of a photonic crystal can be different for each polarization of light (e.g., right-handed circular polarization or left-handed circular polarization), depending on the symmetry of the material.

Ruthenium complexes may be used to mediate the ring-opening metathesis polymerization of sterically bulky macromonomers (MMs) to high molecular weight (MW) molecular brush copolymers. Exploiting the advantageous characteristics (i.e. stability, livingness, functional group and steric tolerance) of catalysts such as 1 (FIG. 2), well-defined, high MW brush copolymers with quantitative grafting density have been synthesized. More so, the living nature of this polymerization system has enabled sequential and statistical copolymerization of various MM's. In the case of brush block copolymers, microphase segregation to extremely large polymer domains can be rapidly achieved, producing photonic band-gap materials that can reflect long wavelengths of light. Additionally, if the grafts are composed of rigid polyisocyanates, self-assembly to even larger domains is facilitated, and infrared-reflecting (IR-reflecting) materials can be fabricated through simple controlled evaporation.

Living polymerization of isocyanates may be accomplished by using halftitanocene complexes as initiators, which quantitatively incorporate a specific chain-end group. As an example, this approach is an efficient means to produce exo-norbornene functionalized MM's, which have been shown to be excellent substrates for ROMP. Furthermore, polyisocyanates are a class of polymers known to assume a helical conformation with excess one-handed helicity in the presence of a chiral bias. Optically active helical polyisocyanate grafts are able to influence the chiroptical properties of brush copolymers. As an example, chirality of polyisocyanate grafts may be transferred to a low degree-of-polymerization (DP) (DP~20) polyphenylacetylene main-chain, thereby inducing excess one-handed helicity into the main-chain. Separately, tethering one-handed helical polyisocyanate grafts to a polystyrene main-chain induces a switch in the helix-sense of the polyisocyanate grafts once the brush polymer aggregates.

The difficulty of incorporating chiral elements into photonic crystals has limited the ability to generate unique bandstructures for different circular polarizations of light. As such, there is a need to develop methods of easily, predictably fabricating chiral photonic crystals having these properties. Chiral photonic crystals have a number of applications in optics.

SUMMARY OF THE INVENTION

In certain embodiments, the invention relates to a chiral photonic crystal, comprising:
a copolymer having a main chain and a plurality of side groups, each side group bound to a monomer unit of the main chain;
wherein
the copolymer self-assembles into a chiral photonic crystal through microphase segregation; and
the chiral photonic crystal reflects circularly polarized light of a first wavelength to a different extent depending on the direction of circular polarization of the circularly polarized light.

In certain embodiments, the invention relates to a thin film comprising any one of the chiral photonic crystals described herein.

In certain embodiments, the invention relates to a method of forming a chiral photonic crystal, comprising:
providing a plurality of polymeric molecules that rotate polarized light, each molecule containing a reactive terminal monomer unit;
polymerizing the reactive terminal monomer units to form a copolymer comprising a main chain formed by the polymerized terminal monomer units and polymeric side groups derived from the polymeric molecules; and
fostering self-assembly of the copolymer into a chiral photonic crystal through microphase segregation, and
wherein the chiral photonic crystal reflects circularly polarized light of a first wavelength to a different extent depending on the direction of circular polarization of the circularly polarized light.

BRIEF DESCRIPTION OF THE FIGURES

FIG. 3 tabulates the results of copolymerization of hexyl isocyanate and (R)-2,6-dimethylheptyl isocyanate initiated by complexes 2-4. The reactions were carried out in 100 µL, THF at ambient temperature. $^b$Initiator employed. $^c$Isolated yield. $^d$Determined by Light Scattering. $^e$Determined by polarimetry (c=2.0 g/L; CHCl$_3$).

FIG. 4 tabulates the results of polymerization of macromonomers mediated by 1 to chiral brush copolymers. The reactions were carried out in 2 mL THF at ambient temperature. $^b$Isolated yield. $^c$Determined by Light Scattering. $^d$Determined by polarimetry (c=2.0 g/L; CHCl$_3$). $^e$Non-stable measurement.

DETAILED DESCRIPTION OF THE INVENTION

I. Overview

In one aspect, the invention relates to polymers bearing chiral side groups (i.e., substituents or side chains), where the chirality of the substituents or side chains is non-racemic (e.g., preferably uniform or substantially uniform), thereby imparting chiroptical properties to the polymers as a whole. Suitable substituents or side chains include saccharides (including mono-, di-, and tri-saccharides), cyclodextrins, amino acids, and oligomers or even polymers of chiral monomers.

In certain embodiments, the invention relates to copolymers comprising one-handed helical grafts. In certain embodiments, the invention relates to high MW copolymers comprising one-handed helical grafts. In certain embodiments, the invention relates to copolymers that self-assemble, thereby resulting in materials with interesting chiroptical properties. In certain embodiments, the one-handed helical grafts comprise polyisocyanate.

In certain embodiments, the invention relates to any one of the copolymers described herein, wherein the copolymer is a brush copolymer. In certain embodiments, the invention relates to any one of the copolymers described herein, wherein the main-chain of the copolymer comprises polynorbornene.

In certain embodiments, the invention relates to the cyclopolymerization of 1,6-heptadiyne functionalized chiral polyisocyanate MM's mediated by 1 to highly-conjugated polyacetylene.

In certain embodiments, the invention relates to complexes 3 or 4, either of which is readily isolated in good yield from the reaction of $CpTiCl_3$ and the appropriate alcohol derivative in the presence of $Et_3N$.

In certain embodiments, the invention relates to the use of complex 2, 3, or 4 to produce MM's. In certain embodiments, the MMs produced are suitable for ROMP (ring-opening metathesis polymerization) of the exo-norbornene moiety. In certain embodiments, the MM's produced are susceptible to Ru-mediated cyclopolymerization.

Figure 1:
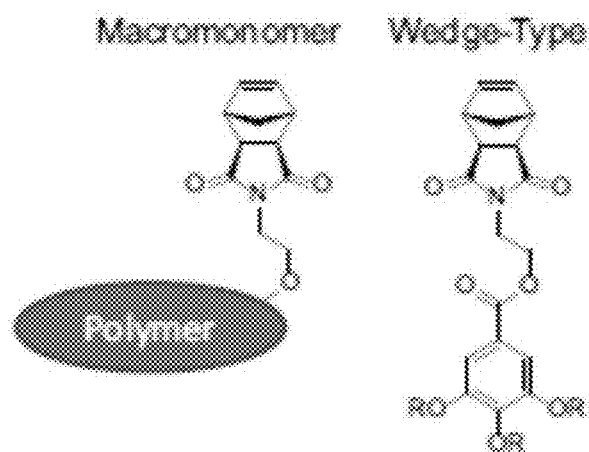
FIG. 1 depicts the general structures of macromonomers and wedge-type monomers.
Figure 2:
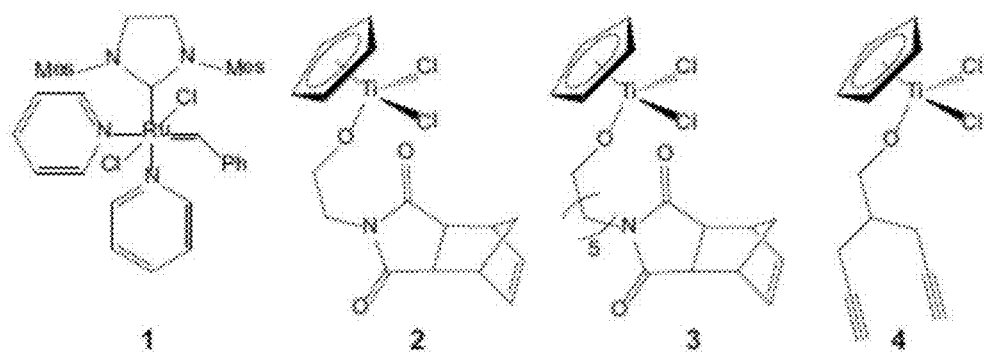
FIG. 2 depicts the structures of a catalyst (1) and initiators (2, 3, and 4) useful in exemplary methods of the invention.

In certain embodiments, the invention relates to the copolymerization of hexyl isocyanate with (R)-2,6-dimethylheptyl isocyanate to produce isocyanate copolymers with excess one-handed helicity. In certain embodiments, complexes 2-4 are employed to produce the appropriately functionalized chiral isocyanate-based MM's by initiating the copolymerization of hexyl isocyanate with (R)-2,6-dimethylheptyl isocyanate. In certain embodiments, the MM's are obtained in good to high yields. In certain embodiments, the MM's possess narrow molecular weight distributions (MWD's). In certain embodiments, the MM's possess non-zero optical rotations, confirming the expected excess one-handed helicity induced by the presence of the chiral co-monomer (FIG. 2).

Figure 7:
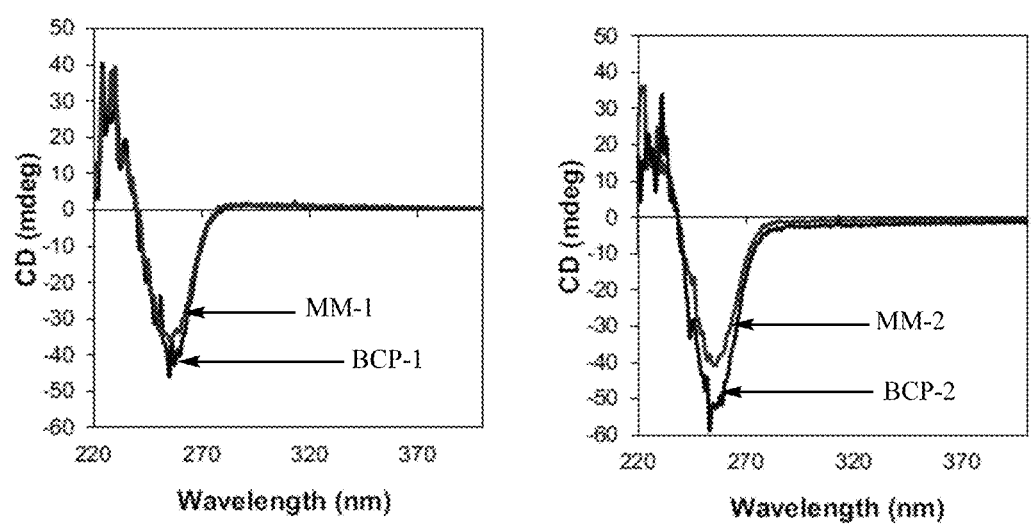
FIG. 7 depicts CD plot (left) of MM-1 and the brush copolymer constructed from it and CD plot (right) of MM-2 and the brush polymer constructed from it.

MM-1 was polymerized by 1 to afford the well-defined brush copolymer with weight average molecular weight ($M_w$) of 1185 kDa and narrow a MWD of 1.09 (Run 1, FIG. 4). The brush polymer showed a nearly identical optical rotation ($[\alpha]^{23}_D=-85.9°$) to the MM that it was constructed from ($[\alpha]^{23}_D=-87.9°$). While not wishing to be bound by any particular theory, this result suggests that no chiral amplification is being afforded by the presence of a chiral graft, which if it occurred would most likely result in the final copolymer possessing a greatly different optical rotation than its repeat unit. Further confirming this belief, no significant changes in the circular dichroism (CD) spectra are observed when comparing the CD of the MM and the brush copolymer (FIG. 7). Believing that the chiral polyisocyanate MM may be too close in proximity to the polynorbornene main-chain, thereby locking the side-chains in place in their as-polymerized arrangements, MM-2 was prepared. MM-2 possesses a six-carbon spacer, which was theorized to increase flexibility and side-chain mobility. The brush copolymer produced through the ROMP of MM-2 mediated by 1 had a high MW ($M_w=1027$ kDa) and narrow MWD of 1.14 (Run 2, FIG. 4). Its optical rotation ($[\alpha]^{23}_D=-99.8°$) was nearly identical to MM-2 ($[\alpha]^{23}_D=-102.7°$) and no significant changes in the Cotton effects were observed in the CD (FIG. 7), when comparing the MM and brush copolymer, showing that no chiral amplification was occurring.

Figure 5:
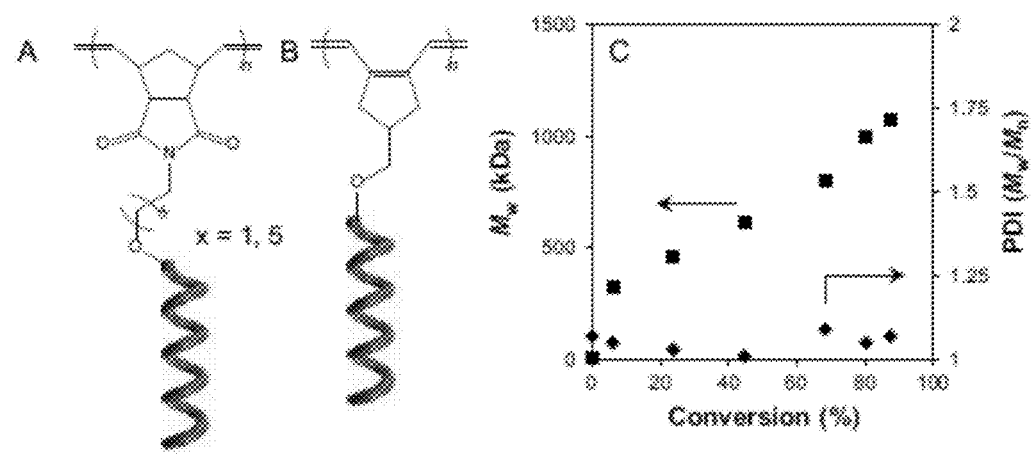
FIG. 5 depicts schematic structures of brush copolymers composed of polynorbornene (A) and polyacetylene (B) main-chains and one-handed helical polyisocyanate side-groups. (C) Plot of Mw and PDI vs conversion for the cyclopolymerization of MM-3 mediated by 1.
Figure 6:
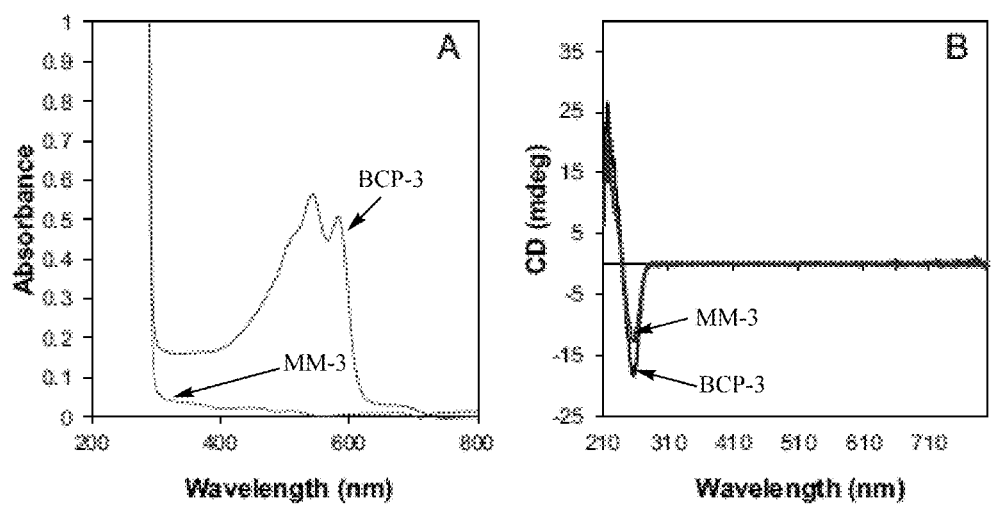
FIG. 6 depicts (A) UV-vis spectrum of MM-3 and the brush copolymer synthesized from this macromonomer (B) CD spectrum of MM-3 and the brush copolymer synthesized from this macromonomer (c=0.5 g/L; THF, 25° C.).

In certain embodiments, the invention relates to any one of the brush copolymers described herein, wherein the main-chain comprises polyacetylene, which is more flexible than polynorbornene (FIG. 5). Polyacetylenes are well-known to adopt helical conformations, so MM-3 was prepared ($M_w=16.6$ kDa, MWD=1.10, $[\alpha]^{23}_D=-90.7°$, run 3, FIG. 3), because 1,6-heptadiynes have been shown to be susceptible to controlled polymerization by ruthenium metathesis catalysts to afford polyacetylenes via a cyclopolymerization mechanism. Although this route had not yet been proven for polymerizing MM's, MM-3 was efficiently polymerized to a well-defined polyacetylene brush copolymer ($M_w=648.0$ kDa, MWD=1.13, run 3, FIG. 4). The colorless MM solution immediately turns dark red upon addition of catalysts, due to the formation of the conjugated polyacetylene main-chain. The UV-vis spectrum of the isolated polymer shows two peaks corresponding to the planar, five-membered ring structure of the regioregular copolymer main-chain (FIG. 6A). No secondary reactions (i.e., cross-metathesis) for the polyacetylene brush polymer were observed, even with prolonged reaction times, as demonstrated by the unchanged MW or MWD of the polymer after complete MM conversion (up to 24 h). Furthermore, the cyclopolymerization of MM-3 exhibited living characteristics. Specifically, a linear increase in MW with increasing MM conversion, as well as a nearly constant MWD during the course of polymerization was observed (FIG. 5C). Only minor changes in the CD were observed when comparing MM-3 and the resulting brush copolymer, especially when examining the spectral region that corresponds to the polyacetylene main-chain, which exhibited no Cotton effects, suggesting no chiral amplification in the polymer main-chain (FIG. 6B). However, the intensity of the Cotton effect corresponding to the polyisocyanate graft did increase. This result suggests that the steric crowding of the grafts influences additional excess-helicity into the grafts. While not wishing to be bound by any particular theory, this minimal overall change in chiral amplification may be attributed to the high grafting-density of brush copolymers produced in this "grafting-through" approach, which discourages any post-polymerization reorganization.

Figure 8:
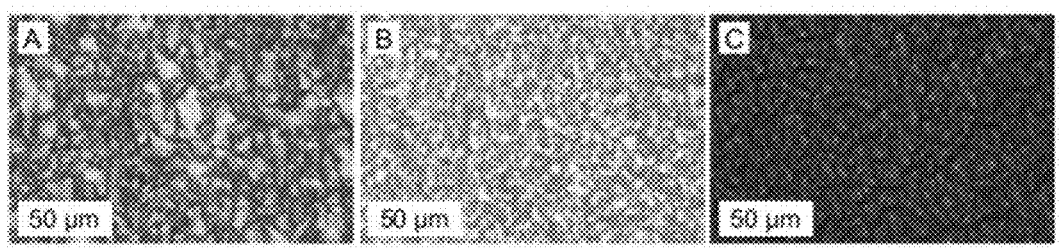
FIG. 8 depicts polarized optical micrographs of solid thin-films of the brush polymers (A, B, and C are films fabricated from the polymers reported in runs 1, 2, and 3 in FIG. 4, respectively).
Figure 9:
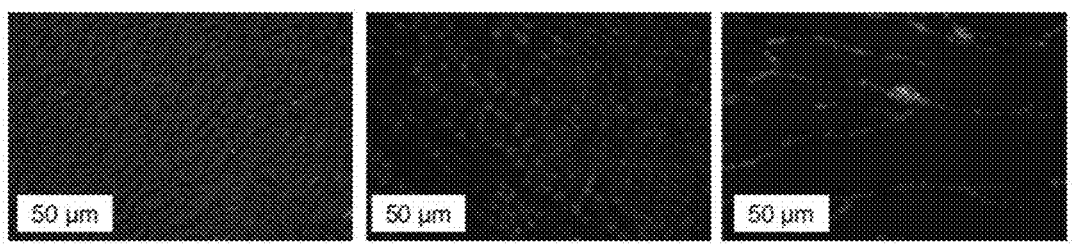
FIG. 9 depicts polarized optical micrographs of MM-1 (left), MM-2 (center), and MM-3 (right).

Polyisocyanates are well known to exhibit liquid crystal properties; therefore, in certain embodiments, the invention relates to the ability of these chiral brush copolymers to assemble to chiral, anisotropic bulk materials. To highlight the rapid self-assembly of these brush polymers to well-ordered chiral materials, thin films of the three brush polymers were fabricated through the controlled evaporation of CHCl₃ solutions onto glass substrates. Polarized optical micrographs of the films were acquired to probe the homogeneity and long-range order of these chiral materials, and compared to images taken of films prepared from the MM's themselves. Although uniform films were obtained in all cases, it can be readily observed that the long-range chiral anisotropy is only achieved in films obtained from the brush copolymers and is continuous throughout the film area (FIG. 8). In contrast, only small, discrete regions in the films prepared from the MM's show anisotropy, while most of the polarized optical micrograph image remains black due to the isotropic domains (FIG. 9). These data highlight the ability of brush copolymers to rapidly self-assemble the one-handed helical side-chains to highly ordered chiral materials.

In certain embodiments, the invention relates to brush block copolymers containing optically-active macromonomers. Four brush copolymers were synthesized with the following compositions:

82: optically-active hexyl isocyanate and racemic hexyl isocyanate grafts;
83: optically-active hexyl isocyanate and phenylbutyl isocyanate grafts;
84: optically-active phenylbutyl isocyanate and racemic hexyl isocyanate grafts; and
85: optically-active hexyl isocyanate and racemic phenylbutyl isocyanate grafts.

Figure 10:
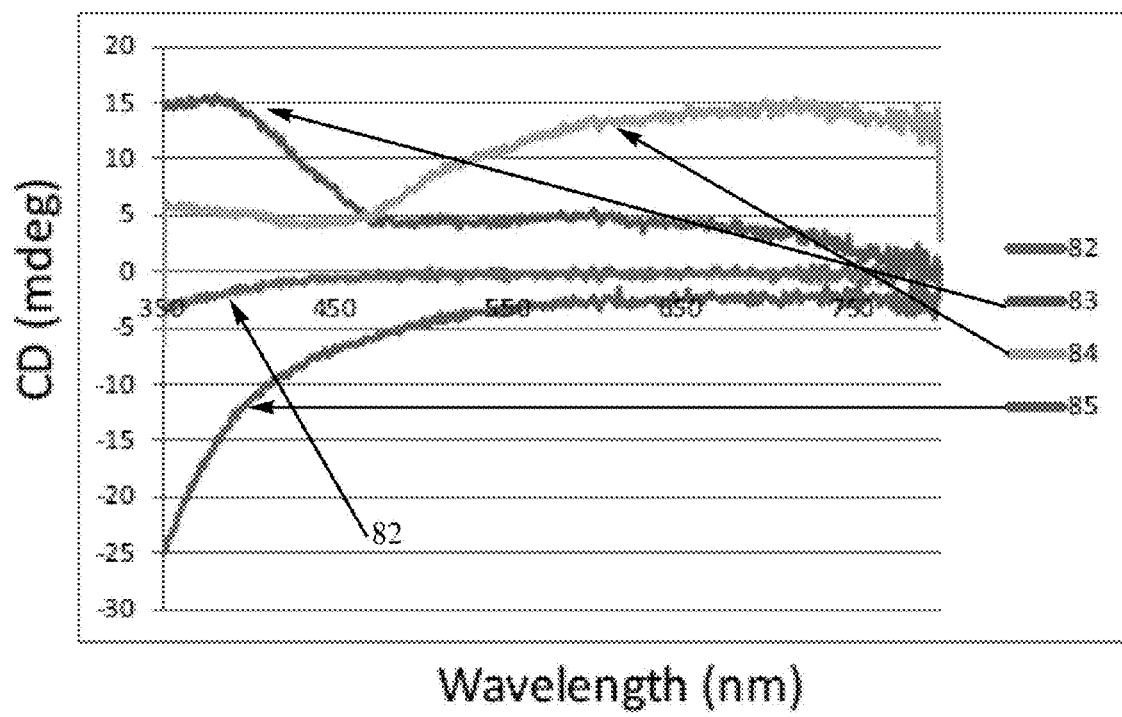
FIG. 10 depicts CD spectra of chiral photonic crystals.
Figure 11:
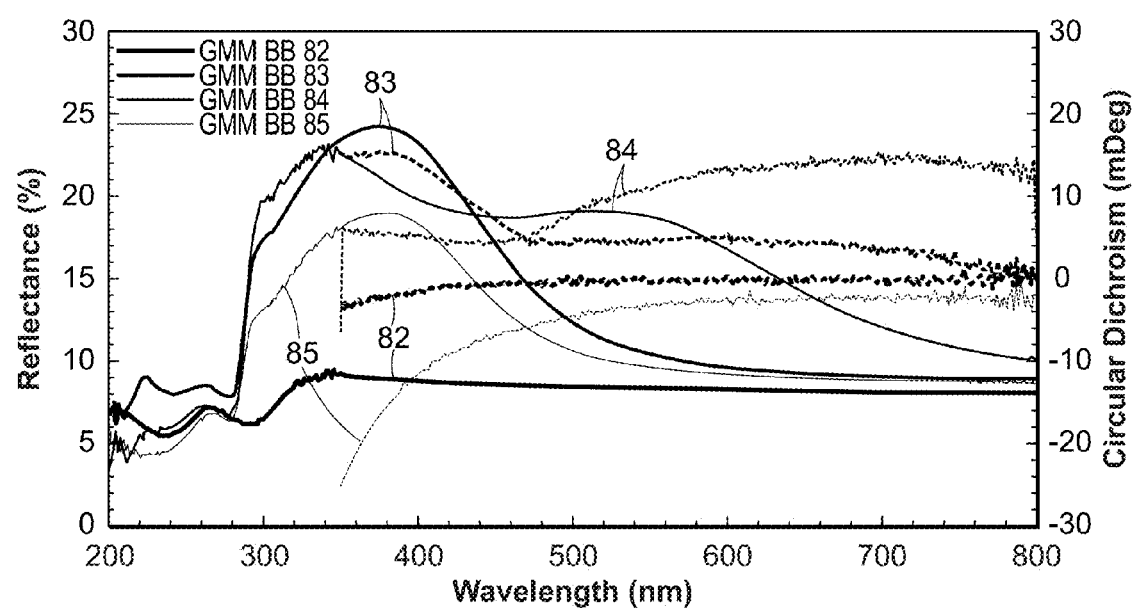
FIG. 11 depicts the diffuse reflectance (solid lines, left axis) and CD spectra (dashed lines, right axis) of chiral photonic crystals as a function of wavelength.

Thin films of the copolymers were then deposited on glass slides via controlled evaporation from dichloromethane solutions. CD analysis of the films revealed that the materials were chiral photonic crystals. In other words, circularly polarized light was reflected at wavelengths of light related to the photonic characteristics of the films, rather than wavelengths of light corresponding to the Cotton effects of the macromonomers (FIG. 10). Right- and left-handed polarizations are orthogonal, and will interact with a chiral photonic crystal independently. Each polarization of light will have a unique bandstructure in a chiral photonic crystal.

II. Exemplary Complexes

In certain embodiments, the invention relates to a complex of Formula I or a complex of Formula II:

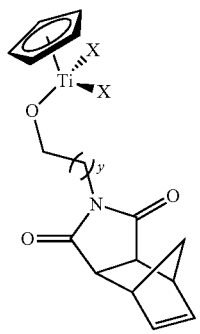

Formula I

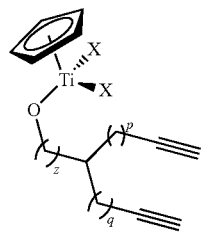

Formula II wherein
X is a monovalent ligand, such as alkoxy or halo, e.g., chloro;
y is 2, 3, 4, 5, 6, or 7;
p is 0, 1, or 2;
q is 0, 1, or 2;
the sum of p and q is 2 or 3; and
z is 0, 1, 2, 3, 4, or 5.

In certain embodiments, the invention relates to any one of the aforementioned complexes, wherein the complex is a complex of Formula I; and y is 3, 4, or 5. In certain embodiments, the invention relates to any one of the aforementioned complexes, wherein the complex is a complex of Formula I; and y is 3 or 5. In certain embodiments, the invention relates to any one of the aforementioned complexes, wherein the complex is a complex of Formula I; and y is 5.

In certain embodiments, the invention relates to any one of the aforementioned complexes, wherein the complex is a complex of Formula II; and p is 1.

In certain embodiments, the invention relates to any one of the aforementioned complexes, wherein the complex is a complex of Formula II; and q is 1.

In certain embodiments, the invention relates to any one of the aforementioned complexes, wherein the complex is a complex of Formula II; and the sum of p and q is 2.

In certain embodiments, the invention relates to any one of the aforementioned complexes, wherein the complex is a complex of Formula II; and z is 1.

In certain embodiments, the invention relates to a complex selected from:

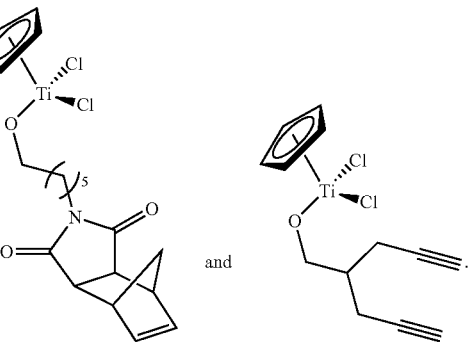

III. Exemplary Monomers

In certain embodiments, the invention relates to a monomer having a one-handed helical nature. In certain embodiments, the invention relates to any one of the monomers described herein, wherein the monomer comprises a reactive terminal monomer unit and a side-group. Preferably, the monomer is a macromonomer.

In certain embodiments, the invention relates to a macromonomer having a one-handed helical nature. In certain embodiments, the invention relates to any one of the macromonomers described herein, wherein the macromonomer comprises a reactive terminal monomer unit and a polymer side-group. In certain embodiments, the one-handed helical nature of the macromonomer is influenced by the presence of chiral components of the polymer. In certain embodiments, the chiral components of the polymer are selected from chiral repeat units and chiral chain end-groups.

In certain embodiments, the invention relates to any one of the monomers described herein, wherein the monomer comprises a reactive terminal monomer unit and a dendritic side-group. In certain embodiments, the one-handed helical nature of the monomer is influenced by the presence of chiral components of the dendrimer.

In certain embodiments, the one-handed helical nature of the monomer is influenced by non-covalent interactions. For example, one-handed helicity can be induced by the presence of chiral guest molecules or through the preparation or processing of the materials in a chiral medium, such as a chiral solvent or applied field.

In certain embodiments, the invention relates to any one of the macromonomers described herein, wherein the $M_w$ of the macromonomer is from about 3 kDa to about 30 kDa. In certain embodiments, the invention relates to any one of the macromonomers described herein, wherein the $M_w$ of the macromonomer is about 3 kDa, about 4 kDa, about 5 kDa, about 6 kDa, about 7 kDa, about 8 kDa, about 9 kDa, about 10 kDa, about 11 kDa, about 12 kDa, about 13 kDa, about 14 kDa, about 15 kDa, about 16 kDa, about 17 kDa, about 18 kDa, about 19 kDa, about 20 kDa, about 21 kDa, about 22 kDa, about 23 kDa, about 24 kDa, about 25 kDa, about 26 kDa, about 27 kDa, about 28 kDa, about 29 kDa, or about 30 kDa. In certain embodiments, the $M_w$ of the macromonomer is determined by light scattering.

In certain embodiments, the invention relates to any one of the macromonomers described herein, wherein the MWD ($M_w/M_n$) of the macromonomer is from about 1.01 to about 1.30. In certain embodiments, the invention relates to any one of the macromonomers described herein, wherein the MWD of the macromonomer is about 1.02, about 1.03, about 1.04, about 1.05, about 1.06, about 1.07, about 1.08, about 1.09, about 1.10, about 1.11, about 1.12, about 1.13, about 1.14, about 1.15, about 1.16, about 1.17, about 1.18, about 1.19, about 1.20, about 1.21, about 1.22, about 1.23, about 1.24, about 1.25, about 1.26, about 1.27, about 1.28, about 1.29, or about 1.30. In certain embodiments, the MWD of the macromonomer is determined by light scattering.

In general, the monomer may be a cyclic olefin represented by the structure of formula (A):

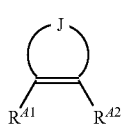

(A)

wherein J, $R^{A1}$, and $R^{A2}$ are as follows:

$R^{A1}$ and $R^{A2}$ are selected from the group consisting of hydrogen, hydrocarbyl (e.g., $C_1$-$C_{20}$ alkyl, $C_5$-$C_{20}$ aryl, $C_5$-$C_{30}$ aralkyl, or $C_5$-$C_{30}$ alkaryl), substituted hydrocarbyl (e.g., substituted $C_1$-$C_{20}$ alkyl, $C_5$-$C_{20}$ aryl, $C_5$-$C_{30}$ aralkyl, or $C_5$-$C_{30}$ alkaryl), heteroatom-containing hydrocarbyl (e.g., $C_1$-$C_{20}$ heteroalkyl, $C_5$-$C_{20}$ heteroaryl, heteroatom-containing $C_5$-$C_{30}$ aralkyl, or heteroatom-containing $C_5$-$C_{30}$ alkaryl), and substituted heteroatom-containing hydrocarbyl (e.g., substituted $C_1$-$C_{20}$ heteroalkyl, $C_5$-$C_{20}$ heteroaryl, heteroatom-containing $C_5$-$C_{30}$ aralkyl, or heteroatom-containing $C_5$-$C_{30}$ alkaryl) and, if substituted hydrocarbyl or substituted heteroatom-containing hydrocarbyl, wherein the substituents may be functional groups ("Fn") such as phosphonato, phosphoryl, phosphanyl, phosphino, sulfonato, $C_1$-$C_{20}$ alkylsulfanyl, $C_5$-$C_{20}$ arylsulfanyl, $C_1$-$C_{20}$ alkylsulfonyl, $C_5$-$C_{20}$ arylsulfonyl, $C_1$-$C_{20}$ alkylsulfinyl, $C_5$-$C_{20}$ arylsulfinyl, sulfonamido, amino, amido, imino, nitro, nitroso, hydroxyl, $C_1$-$C_{20}$ alkoxy, $C_5$-$C_{20}$ aryloxy, $C_2$-$C_{20}$ alkoxycarbonyl, $C_5$-$C_{20}$ aryloxycarbonyl, carboxyl, carboxylato, mercapto, formyl, $C_1$-$C_{20}$ thioester, cyano, cyanato, thiocyanato, isocyanate, thioisocyanate, carbamoyl, epoxy, styrenyl, silyl, silyloxy, silanyl, siloxazanyl, boronato, boryl, or halogen, or a metal-containing or metalloid-containing group (wherein the metal may be, for example, Sn or Ge). $R^{A1}$ and $R^{A2}$ may itself be one of the aforementioned groups, such that the Fn moiety is directly bound to the olefinic carbon atom indicated in the structure. In the latter case, however, the functional group will generally not be directly bound to the olefinic carbon through a heteroatom containing one or more lone pairs of electrons, e.g., an oxygen, sulfur, nitrogen, or phosphorus atom, or through an electron-rich metal or metalloid such as Ge, Sn, As, Sb, Se, Te, etc. With such functional groups, there will normally be an intervening linkage $Z^*$, such that either or both of $R^{A1}$ and $R^{A2}$ then has the structure —$(Z^*)_n$—Fn wherein n is 1, Fn is the functional group, and $Z^*$ is a hydrocarbylene linking group such as an alkylene, substituted alkylene, heteroalkylene, substituted heteroalkene, arylene, substituted arylene, heteroarylene, or substituted heteroarylene linkage.

J is a saturated or unsaturated hydrocarbylene, substituted hydrocarbylene, heteroatom-containing hydrocarbylene, or substituted heteroatom-containing hydrocarbylene linkage, wherein when J is substituted hydrocarbylene or substituted heteroatom-containing hydrocarbylene, the substituents may include one or more —$(Z^*)_n$—Fn groups, wherein n is zero or 1, and Fn and $Z^*$ are as defined previously. Additionally, two or more substituents attached to ring carbon (or other) atoms within J may be linked to form a bicyclic or polycyclic olefin. J will generally contain in the range of approximately 5 to 14 ring atoms, typically 5 to 8 ring atoms, for a monocyclic olefin, and, for bicyclic and polycyclic olefins, each ring will generally contain 4 to 8, typically 5 to 7, ring atoms.

As used herein, the compound of formula (A) may be a chiral, non-racemic compound. For example, at least one of $R^{A1}$ or $R^{A2}$ may comprise a chiral, non-racemic moiety, such that (A) is a chiral, non-racemic compound. Alternatively, or in addition, J may comprise a chiral, non-racemic moiety, such that (A) is a chiral, non-racemic compound.

Mono-unsaturated cyclic olefins encompassed by structure (A) may be represented by the structure (B)

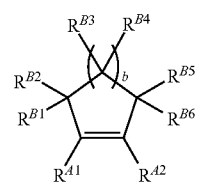

(B)

wherein b is an integer generally although not necessarily in the range of 1 to 10, typically 1 to 5, $R^{A1}$ and $R^{A2}$ are as defined above for structure (A), and $R^{B1}$, $R^{B2}$, $R^{B3}$, $R^{B4}$, $R^{B5}$, and $R^{B6}$ are independently selected from the group consisting of hydrogen, hydrocarbyl, substituted hydrocarbyl, heteroatom-containing hydrocarbyl, substituted heteroatom-containing hydrocarbyl and —(Z*)$_n$—Fn where n, Z* and Fn are as defined previously, and wherein if any of the $R^{B1}$ through $R^{B6}$ moieties is substituted hydrocarbyl or substituted heteroatom-containing hydrocarbyl, the substituents may include one or more —(Z*)$_n$—Fn groups, provided that at least one of $R^{A1}$, $R^{A2}$ comprises a chiral, non-racemic moiety, and that the compound of formula (A) is a chiral, non-racemic compound. Accordingly, $R^{B1}$, $R^{B2}$, $R^{B3}$, $R^{B4}$, $R^{B5}$, and $R^{B6}$ may be, for example, hydrogen, hydroxyl, $C_1$-$C_{20}$ alkyl, $C_5$-$C_{20}$ aryl, $C_1$-$C_{20}$ alkoxy, $C_5$-$C_{20}$ aryloxy, $C_2$-$C_{20}$ alkoxycarbonyl, $C_5$-$C_{20}$ aryloxycarbonyl, amino, amido, nitro, etc.

As used herein, the compound of formula (B) may be a chiral, non-racemic compound. For example, at least one of $R^{A1}$ or $R^{A2}$ may comprise a chiral, non-racemic moiety, such that (B) is a chiral, non-racemic compound. Alternatively, or in addition, the identity of one or more of $R^{B1}$, $R^{B2}$, $R^{B3}$, $R^{B4}$, $R^{B5}$, or $R^{B6}$ renders (B) a chiral, non-racemic compound. Alternatively, or in addition, one or more of $R^{B1}$, $R^{B2}$, $R^{B3}$, $R^{B4}$, $R^{B5}$, or $R^{B6}$ may comprise a chiral, non-racemic moiety, such that (B) is a chiral, non-racemic compound.

Furthermore, any of the $R^{B1}$, $R^{B2}$, $R^{B3}$, $R^{B4}$, $R^{B5}$, and $R^{B6}$ moieties can be linked to any of the other $R^{B1}$, $R^{B2}$, $R^{B3}$, $R^{B4}$, $R^{B5}$, $R^{B6}$ moieties to provide a substituted or unsubstituted alicyclic group containing 4 to 30 ring carbon atoms or a substituted or unsubstituted aryl group containing 6 to 18 ring carbon atoms or combinations thereof and the linkage may include heteroatoms or functional groups, e.g. the linkage may include without limitation an ether, ester, thioether, amino, alkylamino, imino, or anhydride moiety. The alicyclic group can be monocyclic, bicyclic, or polycyclic. When unsaturated the cyclic group can contain monounsaturation or multiunsaturation, with monounsaturated cyclic groups being preferred. When substituted, the rings contain monosubstitution or multisubstitution wherein the substituents are independently selected from hydrogen, hydrocarbyl, substituted hydrocarbyl, heteroatom-containing hydrocarbyl, substituted heteroatom-containing hydrocarbyl, —(Z*)$_n$—Fn where n is zero or 1, Z* and Fn are as defined previously, and functional groups (Fn) provided above.

Examples of monounsaturated, monocyclic olefins encompassed by structure (B) include, without limitation, cyclopentene, cyclohexene, cycloheptene, cyclooctene, cyclononene, cyclodecene, cycloundecene, cyclododecene, tricyclodecene, tetracyclodecene, octacyclodecene, and cycloeicosene, and substituted versions thereof such as 1-methylcyclopentene, 1-ethylcyclopentene, 1-isopropylcyclohexene, 1-chloropentene, 1-fluorocyclopentene, 4-methylcyclopentene, 4-methoxy-cyclopentene, 4-ethoxy-cyclopentene, cyclopent-3-ene-thiol, cyclopent-3-ene, 4-methylsulfanyl-cyclopentene, 3-methylcyclohexene, 1-methylcyclooctene, 1,5-dimethylcyclooctene, etc.

Monocyclic diene reactants encompassed by structure (A) may be generally represented by the structure (C)

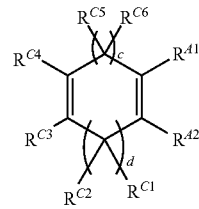

(C)

wherein c and d are independently integers in the range of 1 to about 8, typically 2 to 4, preferably 2 (such that the reactant is a cyclooctadiene), $R^{A1}$ and $R^{A2}$ are as defined above for structure (A), and $R^{C1}$, $R^{C2}$, $R^{C3}$, $R^{C4}$, $R^{C5}$, and $R^{C6}$ are defined as for $R^{B1}$ through $R^{B6}$. In this case, it is preferred that $R^{C3}$ and $R^{C4}$ be non-hydrogen substituents, in which case the second olefinic moiety is tetrasubstituted. Examples of monocyclic diene reactants include, without limitation, 1,3-cyclopentadiene, 1,3-cyclohexadiene, 1,4-cyclohexadiene, 5-ethyl-1,3-cyclohexadiene, 1,3-cycloheptadiene, cyclohexadiene, 1,5-cyclooctadiene, 1,3-cyclooctadiene, and substituted analogs thereof. Triene reactants are analogous to the diene structure (C), and will generally contain at least one methylene linkage between any two olefinic segments.

As used herein, the compound of formula (C) may be a chiral, non-racemic compound. For example, at least one of $R^{A1}$, $R^{A2}$, $R^{C3}$, or $R^{C4}$ may comprise a chiral, non-racemic moiety, such that (C) is a chiral, non-racemic compound. Alternatively, or in addition, the identity of one or more of $R^{C1}$, $R^{C2}$, $R^{C5}$, or $R^{C6}$ renders (C) a chiral, non-racemic compound. Alternatively, or in addition, one or more of $R^{C1}$, $R^{C2}$, $R^{C5}$, or $R^{C6}$ may comprise a chiral, non-racemic moiety, such that (C) is a chiral, non-racemic compound.

Bicyclic and polycyclic olefins encompassed by structure (A) may be generally represented by the structure (D)

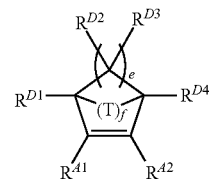

(D)

wherein $R^{A1}$ and $R^{A2}$ are as defined above for structure (A), $R^{D1}$, $R^{D2}$, $R^{D3}$, and $R^{D4}$ are as defined for $R^{B1}$ through $R^{B6}$, e is an integer in the range of 1 to 8 (typically 2 to 4) f is generally 1 or 2; T is lower alkylene or alkenylene (generally substituted or unsubstituted methyl or ethyl), CHR$^{G1}$, C(R$^{G1}$)$_2$, O, S, N—R$^{G1}$, P—R$^{G1}$, O=P—R$^{G1}$, Si(R$^{G1}$)$_2$, B—R$^{G1}$, or As—R$^{G1}$ where R$^{G1}$ is alkyl, alkenyl, cycloalkyl, cycloalkenyl, aryl, alkaryl, aralkyl, or alkoxy. Furthermore, any of the $R^{D1}$, $R^{D2}$, $R^{D3}$, and $R^{D4}$ moieties can be linked to any of the other $R^{D1}$, $R^{D2}$, $R^{D3}$, and $R^{D4}$ moieties to provide a substituted or unsubstituted alicyclic group containing 4 to 30 ring carbon atoms or a substituted or unsubstituted aryl group containing 6 to 18 ring carbon atoms or combinations thereof and the linkage may include heteroatoms or functional groups, e.g. the linkage may include without limitation an ether, ester, thioether, amino, alkylamino, imino, or anhydride moiety. The cyclic group can be monocyclic, bicyclic, or polycyclic. When unsaturated the cyclic group can contain mono-unsaturation or multi-unsaturation, with mono-unsaturated cyclic groups being preferred. When substituted, the rings contain mono-substitution or multi-substitution wherein the substituents are independently selected from hydrogen, hydrocarbyl, substituted hydrocarbyl, heteroatom-containing hydrocarbyl, substituted heteroatom-containing hydrocarbyl, —(Z*)$_n$—Fn where n is zero or 1, Z* and Fn are as defined previously, and functional groups (Fn) provided above.

As used herein, the compound of formula (D) may be a chiral, non-racemic compound. For example, at least one of $R^{A1}$ or $R^{A2}$ may comprise a chiral, non-racemic moiety, such that (D) is a chiral, non-racemic compound. Alternatively, or in addition, the identity of one or more of $R^{D1}$, $R^{D2}$, $R^{D3}$, or $R^{D4}$ renders (D) a chiral, non-racemic compound.

Suitable monomers for the methods disclosed herein include monomers known to those of skill in the art, such as those disclosed in U.S. Patent Application Publication No. 2014/0049823, which is hereby incorporated by reference for the various monomers disclosed therein.

IV. Exemplary Copolymers

In certain embodiments, the invention relates to a copolymer, wherein the copolymer results from polymerizing any one (or more) of the monomers described herein.

In certain embodiments, the invention relates to any one of the copolymers described herein, wherein the copolymer is a brush copolymer.

In certain embodiments, the invention relates to any one of the copolymers described herein, wherein the copolymer is a polymer having a plurality of dendritic side-group.

In certain embodiments, the invention relates to any one of the copolymers described herein, wherein the $M_w$ of the brush copolymer is from about 300 kDa to about 35,000 kDa.

In certain embodiments, the invention relates to any one of the copolymers described herein, wherein the $M_w$ of the brush copolymer is about 300 kDa, about 350 kDa, about 400 kDa, about 450 kDa, about 500 kDa, about 550 kDa, about 600 kDa, about 650 kDa, about 700 kDa, about 750 kDa, about 800 kDa, about 850 kDa, about 900 kDa, about 950 kDa, about 1000 kDa, about 1100 kDa, about 1200 kDa, about 1300 kDa, about 1400 kDa, about 1500 kDa, or about 1600 kDa. In certain embodiments, the $M_w$ of the copolymer is determined by light scattering.

In certain embodiments, the invention relates to any one of the copolymers described herein, wherein the MWD ($M_w/M_n$) of the copolymer is from about 1.01 to about 4.5. In certain embodiments, the invention relates to any one of the copolymers described herein, wherein the MWD of the copolymers is about 1.02, about 1.03, about 1.04, about 1.05, about 1.06, about 1.07, about 1.08, about 1.09, about 1.10, about 1.11, about 1.12, about 1.13, about 1.14, about 1.15, about 1.16, about 1.17, about 1.18, about 1.19, about 1.20, about 1.21, about 1.22, about 1.23, about 1.24, about 1.25, about 1.26, about 1.27, about 1.28, about 1.29, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, about 2.8, about 2.9, about 3.0, about 3.1, about 3.2, about 3.3, about 3.4, about 3.5, about 3.6, about 3.7, about 3.8, about 3.9, about 4.0, about 4.1, about 4.2, about 4.3, about 4.4, or about 4.5. In certain embodiments, the MWD of the copolymer is determined by light scattering.

In certain embodiments, the invention relates to any one of the copolymers described herein, wherein the DP of the main chain is greater than about 40.

In certain embodiments, the invention relates to a copolymer resulting from the polymerization of a plurality of chiral, discrete monomers. In certain embodiments, the invention relates to any one of the copolymers described herein, wherein the chiral, discrete monomers are chiral wedge-type monomers.

In certain embodiments, the invention relates to a thin film comprising any one of the copolymers described herein.

V. Exemplary Photonic Crystals

In certain embodiments, the invention relates to a chiral photonic crystal, comprising:
a copolymer having a main chain and a plurality of side groups, each side group bound to a monomer unit of the main chain;
wherein
the copolymer self-assembles into a chiral photonic crystal through microphase segregation; and
the chiral photonic crystal reflects circularly polarized light of a first wavelength to a different extent depending on the direction of circular polarization of the circularly polarized light.

In certain embodiments, the invention relates to any one of the chiral photonic crystals described herein, wherein the copolymer is any one of the copolymers described herein.

In certain embodiments, the invention relates to any one of the chiral photonic crystals described herein, wherein the chiral photonic crystal has a photonic bandgap in the ultraviolet spectrum, in the visible spectrum, in the near-infrared spectrum, or in the infrared spectrum.

In certain embodiments, the invention relates to any one of the chiral photonic crystals described herein, wherein the side groups are straight-chain polymers.

In certain embodiments, the invention relates to any one of the chiral photonic crystals described herein, wherein the side groups are dendrimers.

In certain embodiments, the invention relates to any one of the chiral photonic crystals described herein, wherein the side groups comprise chiral moieties.

In certain embodiments, the invention relates to any one of the chiral photonic crystals described herein, wherein the chiral moieties are one-handed helical polyisocyanate strands.

In certain embodiments, the invention relates to any one of the chiral photonic crystals described herein, wherein the one-handed helical polyisocyanate strands comprise polymerized 1,6-heptadiyne functionalized polyisocyanate monomer units.

In certain embodiments, the invention relates to any one of the chiral photonic crystals described herein, wherein the one-handed helical polyisocyanate strands result from copolymerizing hexyl isocyanate with (R)-2,6-dimethylheptyl isocyanate.

In certain embodiments, the invention relates to any one of the chiral photonic crystals described herein, wherein the one-handed helical polyisocyanate strands result from copolymerizing phenylbutyl isocyanate with (R)-2,6-dimethylheptyl isocyanate.

In certain embodiments, the invention relates to any one of the chiral photonic crystals described herein, wherein the copolymer comprises inclusion hosts associated with chiral guest molecules.

In certain embodiments, the invention relates to any one of the chiral photonic crystals described herein, wherein the copolymer has a chirality derived from stereocenters in backbones of the side groups.

In certain embodiments, the invention relates to any one of the chiral photonic crystals described herein, wherein the side groups of the copolymer are covalently linked to chiral moieties.

In certain embodiments, the invention relates to any one of the chiral photonic crystals described herein, wherein the side groups of the copolymer are covalently linked to chiral macromolecules.

In certain embodiments, the invention relates to any one of the chiral photonic crystals described herein, wherein the copolymer has a chirality resulting from supramolecular organization of the side groups.

In certain embodiments, the invention relates to any one of the chiral photonic crystals described herein, wherein the main chain comprises polynorbornene.

In certain embodiments, the invention relates to any one of the chiral photonic crystals described herein, wherein the main chain comprises polyacetylene.

In certain embodiments, the invention relates to any one of the chiral photonic crystals described herein, wherein self-assembly of the copolymer occurs rapidly. In certain embodiments, the invention relates to any one of the chiral photonic crystals described herein, wherein self-assembly of the copolymer occurs with little or no processing. In certain embodiments, the invention relates to any one of the chiral photonic crystals described herein, wherein self-assembly of the copolymer yields dry, robust ordered nanostructures.

In certain embodiments, the invention relates to a thin film comprising any one of the chiral photonic crystals described herein.

In certain embodiments, the ability to control molecular, macromolecular, and supramolecular chirality is enabled by this technology. There are a number of applications for the materials demonstrated and proposed herein. Some of these applications include chiral photonic crystals, switchable displays (e.g., liquid crystal displays), high-performance liquid chromatography phases, chiral waveguides, superachromatic (broadband) circular polarizers, optical fibers, chiroptical media, magneto-optical media, non-reciprocal media, chemical sensors, optical switches, optical splitters, and nonlinear media.

VI. Exemplary Methods

In certain embodiments, the invention relates to a method of forming a chiral photonic crystal, comprising:

providing a plurality of molecules, preferably polymeric molecules, that rotate polarized light, each molecule containing a reactive terminal monomer unit;

polymerizing the reactive terminal monomer units to form a copolymer comprising a main chain formed by the polymerized terminal monomer units and side groups (preferably polymeric side groups) derived from the polymeric molecules; and fostering self-assembly of the copolymer into a chiral photonic crystal through microphase segregation, and wherein the photonic crystal reflects circularly polarized light of a first wavelength to a different extent depending on the direction of circular polarization of the circularly polarized light.

In certain embodiments, the invention relates to any one of the methods described herein, wherein the chiral photonic crystal has a photonic bandgap in the ultraviolet spectrum, in the visible spectrum, in the near-infrared spectrum, or in the infrared spectrum.

In certain embodiments, the invention relates to any one of the methods described herein, wherein the polymeric molecules comprise one-handed helical polyisocyanate macromonomers, e.g., 1,6-heptadiyne functionalized polyisocyanate or (R)-2,6-dimethylheptyl isocyanate.

In certain embodiments, the invention relates to any one of the methods described herein, wherein the one-handed helical polyisocyanate macromonomer results from copolymerizing phenylbutyl isocyanate with (R)-2,6-dimethylheptyl isocyanate.

In certain embodiments, the invention relates to any one of the methods described herein, wherein the polymeric molecules are wedge-type monomers.

In certain embodiments, the invention relates to any one of the methods described herein, wherein polymerizing is conducted by ring-closing alkyne polymerization or by ruthenium-mediated ring-opening metathesis polymerization.

In certain embodiments, the invention relates to any one of the methods, wherein polymerizing is initiated by any one of the complexes described herein.

In certain embodiments, the invention relates to any one of the methods described herein, wherein the reactive terminal monomer units comprise norbornene moieties and the main chain comprises polynorbornene.

In certain embodiments, the invention relates to any one of the methods described herein, wherein the main chain comprises polyacetylene.

In certain embodiments, the invention relates to any one of the methods described herein, further comprising forming a thin film of the copolymer.

In certain embodiments, the invention relates to any one of the methods described herein, wherein forming the thin film comprises evaporating a solution of the copolymer.

Suitable methods of polymerization, including the use of various initiators and catalysts, are known to those of skill in the art. As an example, U.S. Patent Application Publication No. 2014/0049823, which is hereby incorporated by reference for the methods disclosed therein, describes reagents and reaction conditions for polymerizing various monomers.

VII. Exemplification

The invention now being generally described, it will be more readily understood by reference to the following examples which are included merely for purposes of illustration of certain aspects and embodiments of the present invention, and are not intended to limit the invention.

Example 1

General Materials and Methods ($H_2$IMes)(PPh$_3$)$_2$(Cl)$_2$RuCHPh was received from Materia Inc. and converted to 1 via literature procedure. All other chemicals were purchased from Sigma Aldrich. (R)-2,6-dimethylheptyl isocyanate, 4-(hydroxymethyl)-1,6-heptadiyne, N-(hydroxyethyl)-cis-5-norbornene-exo-2,3-dicarboximide, N-(hydroxyhexyl)-cis-5-norbornene-exo-2,3-dicarboximide, and CpTiCl$_2$(C$_{11}$H$_{12}$NO$_3$) (2) were made according to literature procedures. Solvents were purified by passage through solvent purification columns and further degassed with argon. Hexyl isocyanate and (R)-2,6-dimethylheptyl isocyanate were dried over CaH$_2$ overnight and vacuum distilled.

All reactions were carried out in flamed Schlenk-type glassware on a dual-manifold Schlenk line or in a nitrogen-filled glovebox. NMR spectra were recorded on a Varian Inova 300 MHz spectrometer. Chemical shifts were referenced to internal solvent resonances and are reported as parts per million relative to tetramethylsilane. High resolution mass spectra were provided by the California Institute of Technology Mass spectrometry Facility. Polymer molecular weights were determined utilizing THF as the eluent by multi-angle light scattering (MALS) gel permeation chromatography (GPC) using a miniDAWN TREOS light scattering detector, a Viscostar viscometer, and an OptilabRex refractive index detector, all from Wyatt Technology. An Agilent 1200 UV-Vis detector was also present in the detector stack. Absolute molecular weights were determined using do/dc values calculated by assuming 100% mass recovery of the polymer sample injected into the GPC. CD was performed on an AVIV Circular Dichroism Spectrometer Model 62A DS. Polymer thin films were prepared from the controlled evaporation of polymer solutions (~1.5 g/L) in chloroform onto glass slides that had been previously washed with methanol and hexane.

Example 2

Synthesis of Metal Complexes

Synthesis of $TiCl_2O_3NC_{21}H_{25}$ (3)

In a 100 mL flask, $CpTiCl_3$ (1.08 g, 4.92 mmol) was dissolved in 20 mL of benzene. With vigorous stirring, a solution of N-(hydroxyhexyl)-cis-5-norbornene-exo-2,3-dicarboximide (1.29 g, 4.92 mmol) and triethylamine (0.498 g, 4.92 mmol) in 20 mL benzene was added dropwise to the titanium solution. The mixture was allowed to stir for 2 hours before being filtered. The volatiles were removed and the solid was recrystallized from a toluene/pentane solution mixture to afford the product (0.856 g, 38.9%) as a yellow powder.

$^1$H NMR ($C_6D_6$, 300 MHz, 25° C.): δ 6.06 (s, 5H), 5.68-5.67 (m, 2H), 3.98 (t, 6.09 Hz, 2H), 3.39 (t, 7.35 Hz, 2H), 2.98-2.92 (m, 2H), 2.14-2.08 (m, 2H), 1.47 (q, 7.35 Hz, 2H), 1.29-0.99 (m, 8H). $^{13}$C NMR ($C_6D_6$, 75 MHz, 25° C.): δ 178, 138, 119, 85.1, 48.2, 45.7, 43.1, 38.8, 33.1, 28.2, 26.9, 25.5. HRMS (FAB+): Calculated: 446.0769. Found: 446.0766.

Synthesis of $TiCl_2OC_{13}H_{14}$ (4)

In a 50 mL flask, $CpTiCl_3$ (0.583 g, 2.66 mmol) was dissolved in 10 mL of benzene. With vigorous stirring, a solution of 4-(hydroxymethyl)-1,6-heptadiyne (0.325 g, 2.66 mmol) and triethylamine (0.269 g, 2.66 mmol) in 10 mL benzene was added drop wise to the titanium solution. The mixture was allowed to stir for 2 hours before being filtered. The volatiles were removed and the solid was recrystallized from a toluene/pentane solution mixture to afford the product (0.432 g, 53.3%) as yellow crystals.

$^1$H NMR ($C_6D_6$, 300 MHz, 25° C.): δ 6.11 (s, 5H), 4.29 (d, 5.43 Hz, 2H), 2.15 (dd, 2.68 Hz, 6.57 Hz, 1H), 2.09 (t, 2.55 Hz, 2H), 2.07 (t, 2.68 Hz, 2H), 2.02 (dd, 2.68 Hz, 6.78, 1H), 1.68-1.65 (m, 1H). $^{13}$C NMR ($C_6D_6$, 75 MHz, 25° C.): δ 120, 84.9, 81.7, 71.2, 40.6, 19.9. HRMS (FAB+): Calculated: 304.9980. Found: 304.9979.

Example 3

Synthesis of Marcromonomers

Synthesis of MM-1

A 10 mL flask was charged with 16.5 mg (42.3 μmol) of 2, 100 μL THF, and a stir bar. With vigorous stirring hexyl isocyanate (0.917 g, 7.21 mmol) and (R)-2,6-dimethylheptyl isocyanate (0.250 g, 1.36 mmol) were added simultaneously. After 24 hours the reaction had solidified. The solid was stirred in methanol and filtered, redissolved in methylene chloride, and reprecipitated into methanol. The macromonomer was isolated by filtration and dried to a constant mass via vacuum to afford a white solid (0.596 g, 48.8%).

$^1$H NMR ($CDCl_3$, 300 MHz, 25° C.): δ 6.31 (bs), 4.30 (bs), 3-98-3.35 (m), 3.29 (bs), 2.72 (bs), 2.11 (bs) 1.59 (bs), 1.29 (bs), 0.87 (bs).

Synthesis of MM-2

A 10 mL flask was charged with 55.3 mg (123 μmol) of 3, 100 μL THF, and a stir bar. With vigorous stirring hexyl isocyanate (2.44 g, 19.2 mmol) and (R)-2,6-dimethylheptyl isocyanate (0.350 g, 1.90 mmol) were added simultaneously. After 20 hours the reaction had solidified. The solid was stirred in methanol and filtered, redissolved in methylene chloride, and reprecipitated into methanol. The macromonomer was isolated by filtration and dried to a constant mass via vacuum to afford a white solid (2.25 g, 80.5%).

$^1$H NMR ($CDCl_3$, 300 MHz, 25° C.): δ 6.29 (bs), 4.16 (bs), 4.02-3.31 (m), 3.27 (bs), 2.68 (bs), 2.09 (bs), 1.94-1.44 (m), 1.29 (bs), 0.88 (bs).

Synthesis of MM-3

A 10 mL flask was charged with 37.8 mg (124 μmol) of 3, 100 μL THF, and a stir bar. With vigorous stirring hexyl isocyanate (1.71 g, 13.5 mmol) and (R)-2,6-dimethylheptyl isocyanate (0.350 g, 1.90 mmol) were added simultaneously. After 20 hours the reaction had solidified. The solid was stirred in methanol and filtered, redissolved in methylene chloride, and reprecipitated into methanol. The macromonomer was isolated by filtration and dried to a constant mass via vacuum to afford a white solid (2.05 g, 78.9%).

$^1$H NMR ($CDCl_3$, 300 MHz, 25° C.): δ 4.28 (bs), 4.09-3.32 (m), 3.21 (bs), 2.41 (bs), 2.03 (bs), 1.97 (bs), 1.91-1.45 (m), 1.29 (bs), 0.88 (bs).

Example 4

Synthesis of Brush Copolymers

In a glovebox, a 20 mL flask was charged with 200 mg of MM, stir bar, and 2 mL of THF. With vigorous stirring, 10 μL of an appropriate concentrated solution of 1 in THF was quickly added and allowed the polymerization was allowed to proceed for the time specified in the figures. After the predetermined time had expired, the flask was removed from the glovebox and 100 μL of ethyl vinyl ether was injected into the solution to quench the polymerization. The reaction was then poured into 20 mL of methanol and stirred for 1 hour. The polymer was filtered and dried to a constant mass via vacuum.

Run 1:

$^1$H NMR ($CDCl_3$, 300 MHz, 25° C.): δ 5.77 (bs), 4.03-3.31 (m), 3.22 (bs), 2.11 (bs), 1.81-1.46 (m), 1.29 (bs), 0.88 (bs). 96.0%. Mw=1185 kDa, PDI=1.09.

Run 2:

$^1$H NMR ($CDCl_3$, 300 MHz, 25° C.): δ 5.78 (bs), 4.38-3.31 (m), 3.21 (bs), 2.09 (bs), 1.81-1.47 (m), 1.29 (bs), 0.88 (bs). 65.8%. Mw=1027 kDa, PDI=1.14.

Run 3:

$^1$H NMR (CDCl$_3$, 300 MHz, 25° C.): δ 5.30 (bs), 4.29-3.30 (m), 3.23 (bs), 2.08 (bs), 1.87-1.44 (m), 1.29 (bs), 0.88 (bs). 99.5%. Mw=648.0 kDa, PDI=1.13.

Example 5

Synthesis of Macromonomers

Synthesis of Racemic Phenylbutyl Isocyanate Grafts (A)

445 mg of 2 and 150 μL of THF were added to a 10-mL round bottom flask with a stir bar. 1.94 mL of phenylbutyl isocyanate was added to the flask by syringe and the solution was allowed to stir for 24 hours. After 24 hours the reaction had solidified. The solid was stirred in methanol and filtered, redissolved in methylene chloride, and reprecipitated into methanol. The macromonomer was isolated by filtration and dried to a constant mass via vacuum to afford a white solid (1.69 g, 84.4%; M$_w$=5.99 kDa, PDI=1.07).

$^1$H NMR (CDCl$_3$, 300 MHz, 25° C.): δ 7.31-7.14 (m), 6.29 (bs), 4.20 (bs), 3.72 (bs), 3.25 (bs), 2.59 (bs), 1.63 (bs), 1.29-1.19 (m).

Synthesis of Optically Active Phenylbutyl Isocyanate Grafts (B)

125 mg of 2 and 150 μL of THF were added to a 10-mL round bottom flask with a stir bar. 1.92 mL of phenylbutyl isocyanate and 0.294 g of (R)-2,6-dimethylheptyl isocyanate were added to the flask by syringe and the solution was allowed to stir for 24 hours. After 24 hours the reaction had solidified. The solid was stirred in methanol and filtered, redissolved in methylene chloride, and reprecipitated into methanol. The macromonomer was isolated by filtration and dried to a constant mass via vacuum to afford a white solid (1.73 g, 76.5%; M$_w$=8.06 kDa, PDI=1.10).

$^1$H NMR (CDCl$_3$, 300 MHz, 25° C.): δ 7.31-7.14 (m), 6.29 (bs), 4.20 (bs), 3.72 (bs), 3.25 (bs), 2.59 (bs), 1.63 (bs), 1.29-1.19 (m).

Synthesis of Optically Active Hexyl Isocyanate Grafts (C):

A 10-mL flask was charged with 125 mg of 2, 100 μL THF, and a stir bar. With vigorous stirring hexyl isocyanate (1.63 mL) and (R)-2,6-dimethylheptyl isocyanate (0.294 g) were added simultaneously. After 24 hours the reaction had solidified. The solid was stirred in methanol and filtered, redissolved in methylene chloride, and reprecipitated into methanol. The macromonomer was isolated by filtration and dried to a constant mass via vacuum to afford a white solid (0.653 g, 38.0%; M$_w$=5.48 kDa, PDI=1.06).

Synthesis of Racemic Hexyl Isocyanate Grafts (D and E):

A 10-mL flask was charged with 650 mg of 2, 40 μL THF, and a stir bar. With vigorous stirring hexyl isocyanate (7.3 mL) was added. After 24 hours the reaction had solidified. The solid was stirred in methanol and filtered, redissolved in methylene chloride, and reprecipitated into methanol. The macromonomer was isolated by filtration and dried to a constant mass via vacuum to afford a white solid (D: 4.96 g, 77.8%; M$_w$=5.47 kDa, PDI=1.06).

Also, a 10-mL round bottom flask was charged with 460 mg of 2 (1.18 mmol), 250 μL of THF, and a stir bar. To the stirred suspension was added 6.87 mL of hexyl isocyanate (47.2 mmol, 40 equiv.). The reaction was allowed to proceed for 21 h before being poured into 50 mL of methanol. The polymer was isolated by filtration, redissolved in methylene chloride, and precipitated again into 50 mL of methanol. MM-1 was isolated by filtration and dried under vacuum at ambient temperature to a constant weight (E: 5.53 g, 92.2%; M$_w$=6.77 kDa, PDI=1.05).

Example 6

Synthesis of Brush Copolymers

Synthesis of 82

In a 20-mL vial with a stir bar, 162 mg of D was dissolved in 3.0 mL of THF. 144 μg of 1 in 10 μL of THF were added to the stirred solution. After 65 minutes 162 mg of C was added as a solid and the reaction was allowed to proceed for an additional 4 hours. The polymerization was quenched by the addition of 200 μL of ethyl vinyl ether and addition of 25 mL of methanol. The mixture was allowed to stir for 1 hour, and the polymer was isolated by filtration and dried under vacuum at ambient temperature to a constant weight. (308 mg, 95.1%; M$_w$=22130 kDa, PDI=2.80).

Synthesis of 83

In a 20-mL vial with a stir bar, 162 mg of C was dissolved in 3.0 mL of THF. 144 μg of 1 in 10 μL of THF were added to the stirred solution. After 65 minutes 238 mg of B was added as a solid and the reaction was allowed to proceed for an additional 4 hours. The polymerization was quenched by the addition of 200 μL of ethyl vinyl ether and addition of 25 mL of methanol. The mixture was allowed to stir for 1 hour, and the polymer was isolated by filtration and dried under vacuum at ambient temperature to a constant weight. (363 mg, 90.7%; M$_w$=10920 kDa, PDI=3.96).

Synthesis of 84

In a 20-mL vial with a stir bar, 200 mg of E was dissolved in 3.0 mL of THF. 144 μg of 1 in 10 μL of THF were added to the stirred solution. After 65 minutes 238 mg of B was added as a solid and the reaction was allowed to proceed for an additional 4 hours. The polymerization was quenched by the addition of 200 μL of ethyl vinyl ether and addition of 25 mL of methanol. The mixture was allowed to stir for 1 hour, and the polymer was isolated by filtration and dried under vacuum at ambient temperature to a constant weight. (379 mg, 86.5%; M$_w$=9868 kDa, PDI=1.61).

Synthesis of 85

In a 20-mL vial with a stir bar, 162 mg of C was dissolved in 3.0 mL of THF. 144 μg of 1 in 10 μL of THF were added to the stirred solution. After 65 minutes 177 mg of A was added as a solid and the reaction was allowed to proceed for an additional 4 hours. The polymerization was quenched by the addition of 200 μL of ethyl vinyl ether and addition of 25 mL of methanol. The mixture was allowed to stir for 1 hour, and the polymer was isolated by filtration and dried under vacuum at ambient temperature to a constant weight. (278 mg, 82.0%; M$_w$=7508 kDa, PDI=1.57).

All publications and patents cited herein are hereby incorporated by reference in their entirety.

Those skilled in the art will recognize, or be able to ascertain using no more than routine experimentation, many equivalents to the specific embodiments of the invention described herein. Such equivalents are intended to be encompassed by the following claims.

The invention claimed is:

1. A chiral photonic crystal, comprising:
   a copolymer having a main chain and a plurality of side groups, each side group bound to a monomer unit of the main chain; wherein
   the main chain comprises polynorbornene or polyacetylene;
   each side group comprises (i) a chiral, non-racemic polyisocyanate or (ii) a dendrimer;
   the copolymer self-assembles into a chiral photonic crystal through microphase segregation; and
   the chiral photonic crystal reflects circularly polarized light of a first wavelength to a different extent depending on the direction of circular polarization of the circularly polarized light.

2. The chiral photonic crystal of claim 1, wherein the photonic crystal has a photonic bandgap in the ultraviolet spectrum, in the visible spectrum, in the near-infrared spectrum, or in the infrared spectrum.

3. The chiral photonic crystal of claim 1, wherein each side group comprises a chiral, non-racemic polyisocyanate.

4. The chiral photonic crystal of claim 1, wherein each side group comprises a chiral, non-racemic polyisocyanate; and the chiral non-racemic polyisocyanate forms a one-handed helical strand.

5. The chiral photonic crystal of claim 1, wherein each side group comprises a chiral, non-racemic polyisocyanate; and the main chain is polyacetylene polymerized from substituted 1,6-heptadiyne monomer units.

6. The chiral photonic crystal of claim 1, wherein each side group comprises a chiral, non-racemic polyisocyanate resulting from copolymerizing hexyl isocyanate with (R)-2,6-dimethylheptyl isocyanate.

7. The chiral photonic crystal of claim 1, wherein the side groups of the copolymer are covalently linked to chiral moieties.

8. The chiral photonic crystal of claim 1, wherein the side groups of the copolymer are covalently linked to chiral macromolecules.

9. The chiral photonic crystal of claim 1, wherein the copolymer has a chirality resulting from supramolecular organization of the side groups.

10. The chiral photonic crystal of claim 1, wherein the main chain comprises polynorbornene.

11. The chiral photonic crystal of claim 1, wherein the main chain comprises polyacetylene.

12. The chiral photonic crystal of claim 1, wherein the side groups are dendrimers.

13. A thin film comprising a chiral photonic crystal of claim 1.

14. A method of forming a chiral photonic crystal according to claim 1, comprising:
   providing a plurality of polymeric molecules that rotate polarized light, each molecule containing a reactive terminal monomer unit;
   polymerizing the reactive terminal monomer units to form a copolymer comprising a main chain comprising polynorbornene or polyacetylene formed by the polymerized terminal monomer units and polymeric side groups comprising (i) a chiral, non-racemic polyisocyanate or (ii) a dendrimer; and
   fostering self-assembly of the copolymer into a chiral photonic crystal through microphase segregation.

15. The method of claim 14, wherein the chiral photonic crystal has a photonic bandgap in the ultraviolet spectrum, in the visible spectrum, in the near-infrared spectrum, or in the infrared spectrum.

16. The method of claim 14, wherein polymerizing is conducted by ring-closing alkyne polymerization or by ruthenium-mediated ring-opening metathesis polymerization.

17. The method of claim 14, further comprising forming a thin film of the copolymer.

18. The method of claim 17, wherein forming the thin film comprises evaporating a solution of the copolymer.

* * * * *